INVENTOR.
Alwyn C. Lapsley
Arthur H. Dexter
BY

Attorney

United States Patent Office 3,293,434
Patented Dec. 20, 1966

3,293,434
PHOTONEUTRON MONITOR FOR DETECTING REACTOR FUEL ELEMENT FAILURES
Arthur H. Dexter, Aiken, S.C., and Alwyn C. Lapsley, Charlottesville, Va., assignors to the United States of America as represented by the United States Atomic Energy Commission
Filed Oct. 17, 1963, Ser. No. 317,098
8 Claims. (Cl. 250—83.1)

The invention described herein was made in the course of, or under, Contract AT(07–2)–1 with the U.S. Atomic Energy Commission.

This invention relates generally to an apparatus and method for the monitoring of fluid streams for the detection of radiations emanating therefrom, and more particularly to the detection of failed fuel elements in operating nuclear reactors.

Detection of radioactivity leaks into nuclear reactor coolant or moderator systems is an important part of reactor instrumentation. In high power reactors, especially gas-cooled reactors, the fuel element claddings are subjected to temperatures which are close to their critical temperatures and, coupled with the corrosion problems associated with liquid cooled reactors, the problem of fuel failure is acute. While the tensile properties of most cladding materials are not appreciably affected by neutron bombardment, the cladding is subject to swelling from within by the retention of fission products and by the anisotropic growth of the fuel; if stressed beyond the design limits, the cladding is susceptible to rupture. Inasmuch as fission products are released into the reactor coolant quite rapidly when a fuel element ruptures, it is of prime importance to detect any fuel failure as quickly as possible in order to minimize the spread of these radioactive materials throughout the reactor system. Thus, the detection of ruptured fuel elements and their location within the reactor core is an important objective of reactor monitoring systems.

Various monitoring systems have been devised for detecting ruptured fuel elements in a neutronic reactor. One system monitors the reactor coolant directly by sequentially taking samples of the coolant and noting any increase in the radioactivity of the coolant stream. Another monitoring system electrostatically precipitates decay products onto a traveling wire which passes through a chamber through which a gas sample from the reactor is passed. For a more complete description see U.S. Patent 2,576,616 issued to R. Livingston and H. Levy November 27, 1951. It has generally been found that gaseous fission product monitors, such as the precipitator monitor mentioned above, provide greater sensitivity for the detection of fuel element failures than do monitors which largely survey the activity of the aqueous coolant. This is largely due to the neutron-activated products, such as $Na^{24}$, $Mg^{27}$, $Al^{28}$, etc., found in the reactor coolant which greatly decreases the sensitivity of the monitor. In the gas-precipitation technique, one has only the background from $Ar^{41}$ to contend with and this is eliminated in the above-mentioned precipitator monitor since the $Ar^{41}$ decays to a stable daughter. While the precipitator monitor has afforded greater sensitivity than the liquid monitors, it has not been completely satisfactory because of the numerous moving parts which are subject to mechanical failure.

Accordingly, it is a general object of the present invention to provide a method of and apparatus for monitoring radioactivity in a fluid stream.

Another object is to provide such a monitoring device which may be used in either homogeneous or heterogeneous reactor systems.

A further object is to provide a fluid monitoring device for detecting failed fuel elements in a neutronic reactor.

A still further object is to provide such a device which is simple in design, has no moving parts, and does not employ electronic discriminators.

A more particular object is to provide a fluid monitoring device for detecting failed fuel elements in a neutronic reactor having high sensitivity, fast response, complete reliability, and ease of maintenance under conditions of exposure to radioactivity. Other objects and advantages will be apparent on reading the following specification with reference to the attached drawing wherein.

The monitoring device of this invention comprises a body of material through which a sample of the fluid stream to be monitored is passed, and which will undergo a $(\gamma, n)$ reaction with gamma rays having an energy at least as great as 1.31 mev. thereby producing photoneutrons. Neutron detection means for indicating the presence of photoneutrons is disposed in said body of material, and indicator means responsive to the detector signal is operatively connected to the detector.

Figure 1:
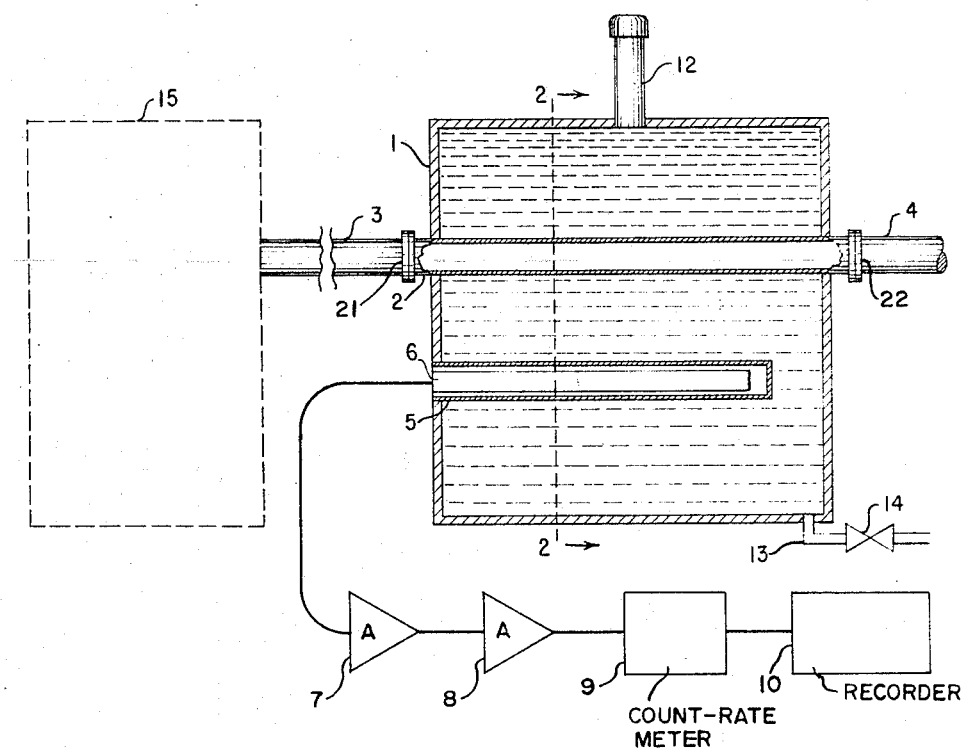
FIG. 1 is a diagrammatic view showing the principal components of the monitoring device of the invention.
Figure 2:
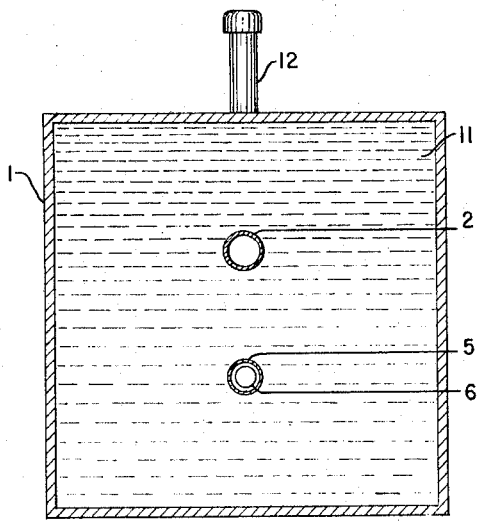
FIG. 2 is a cross-sectional view of the apparatus of FIG. 1 taken along line 2—2.

With reference to FIG. 1, the device of the invention includes a container 1 which may be fabricated in the shape of a rectangular box. The container is provided with a sample gas receiving tube 2 extending completely through it from opposite sides. The ends of this tube are provided with suitable fittings, such as pipe flanges 21, 22, for example, adapted to connect with sample gas inlet and outlet ducts shown schematically at 3 and 4, respectively.

The container also has an instrument well comprised of a tubular opening extending at least partly therethrough as indicated at 5. The inner end of the opening 5 is closed. The openings which constitute both the sample receiving tube 2 and instrument well 5 are formed by tubular elements affixed and sealed to the walls of the container as by welding, at the ends for example. These tubular elements are fabricated from a material having characteristics suitable for the intended purpose. The material for tube 2 should have good strength properties under irradiation for long periods of time and should not have the property of appreciably attenuating gamma rays. The material for tube 5 should also stand up well under long periods of radiation and should be pervious to neutrons.

A neutron counter 6 is removably disposed within the well 5. The counter may be of a conventional type, such as a $BF_3$ tube, having long life, good sensitivity, a high degree of accuracy and fast response. The counter 6 is electrically connected in a circuit including a preamplifier 7, amplifier 8, count-rate meter 9, and recorder 10, as shown in FIG. 1 for measuring and recording the signal produced by the counter 6. These electrical components, as well as the counter 6, are well known devices which are commercially available and their designs are not intended to constitute a part of this invention.

The container 1 is filled with a material 11 which will produce photoneutrons as a result of a $(\gamma, n)$ reaction, where the gamma rays have an energy at least as great as 1.31 mev. Heavy water ($D_2O$) and beryllium have these characteristics and the former is preferred for this application. It is known from "Principles of Nuclear Reactor Engineering" by Samuel Glasstone, D. Van Nostrand Co., Inc., New York, N.Y., 1955, page 80, sections 2.74–2.76, for example, that the threshold energy of gamma rays which produce photoneutrons by these reactions is 2.2 mev. for $D_2O$ and 1.6 mev. for Bé. When $D_2O$ is used, the container 1 is provided with a loading port 12 and a drain line 13 having a shut off valve 14.

The device of this invention is particularly suitable for monitoring nuclear reactors to detect fuel element failures. When used for this purpose the monitor operates as follows. A sample stream of blanket gas, such as helium, or coolant gas, from a reactor fueled with clad uranium and which may be moderated by $D_2O$ for example, is continuously passed by way of duct 3 through the sample gas tube 2 of the photoneutron monitor. Such a reactor is described in U.S.A.E.C. Report No. DP–600, "Final Hazards Evaluation of the Heavy Water Components Test Reactor (HWCTR)" by L. M. Arnett et al., December 1962. When the sample is supplied directly from a reactor, the monitor is preferably located remotely thereto and in any event is shielded from the neutron flux of the reactor. If the sample gas, due to a fuel element failure, contains fission products which emit gamma rays having energies in excess of 2.2 mev. (where $D_2O$ is used as the material 11), such as the radioactive isotopes of xenon and krypton, these will produce neutrons in the heavy water by $(\gamma, n)$ reactions as previously noted. These neutrons are moderated by the heavy water 11 and detected by the counter 6. The signal of the counter is indicated and recorded by the electrical components in the counter circuit as previously mentioned.

The monitor discriminates between the gaseous activity released by a ruptured fuel element and background gaseous activity. Reactor gas background activity is usually caused by radioactive isotopes of oxygen ($O^{14}$), nitrogen ($N^{16}$), and argon ($Ar^{41}$) which are formed by neutron irradiation of air which may enter the reactor when fuel elements are loaded and unloaded, for example, and may not be completely purged. The sample gas flow is controlled to allow a five to ten minute aging period between the reactor and monitor so that the very energetic and short-lived isotopes (such as $N^{16}$ and $O^{19}$) which may be present in the gas have time to decay substantially. This may be accomplished by selecting a size and length of the duct 3 to control the desired flow or providing some conventional flow control means such as pumps and valves, not shown.

This monitor has essentially no background neutron radiation since isotopes emitting gamma rays having energies below the $(\gamma, n)$ threshold value for the material 11, and which are not present due to a fuel element failure, such as $Ar^{41}$ which emits gammas at 1.3 mev., do not produce neutrons in the monitor. As a result, extremely large percentage changes in the signal-to-noise ratio are realized when a fuel failure occurs. In addition, no electronic discriminator is required and therefore there are no drift or recalibration problems.

The mass and spacial arrangement of the deuterium or beryllium with respect to the gas duct and neutron detector may be varied widely. It is only necessary that an appreciable number of gamma rays (emitted by the gas and having greater than the threshold energy) react with the deuterium, or beryllium, and that the neutron detector be within range of the photoneutrons released. Preferably the gas duct and neutron detector are centrally disposed within the mass of deuterium or beryllium. The mass of deuterium or beryllium should be sufficient to provide a significant signal-to-noise ratio; a large excess would be a waste of expensive material. The invention has been found to operate well when the container 1 is in the shape of a 16 inch cube constructed of stainless steel, with the sample gas tube 2 being a 1½ inch diameter pipe, the instrument well being a 1 inch diameter pipe 13 inches long, and the tank being filled with $D_2O$.

Any gas suitable as a blanket, or coolant, for a reactor may be monitored. Such gases include helium, carbon dioxide, and air. The gas flow rate, temperature, and pressure are not critical and may be varied widely.

The ends of the tubes 2 and 5, and the entire monitor, may be shielded where desired (not shown), as is well known, to prevent radiations eminating therefrom into the surrounding areas. Although the invention has been illustrated as used for monitoring a nuclear reactor directly, it may be used for monitoring fluids from any source.

Applicants' photoneutron monitor is one of the most sensitive monitors available for the detection of fuel element failures. It is intrinsically reliable because it has no moving parts or electrically actuated valves.

The device herein described can obviously be modified by a change in the arrangement, disposition and form of the parts without departing from the principle of the invention. Applicants do not intend to be limited to the particular embodiment described, but only within the scope of the accompanying claims.

What is claimed is:

1. A monitor for detecting radiation in a fluid stream comprising a body of material which reacts with the radiation to be detected to produce neutrons, a hollow duct extending through said body of material, means for passing the fluid to be monitored through said duct, a hollow instrument well in said body of material, and a means in said instrument well for detecting the neutrons thus produced.

2. A monitoring device for detecting radiation in a fluid stream comprising a hollow container, a tubular duct extending through said container, a tubular instrument well extending at least partly through said container, a material filling said container which will react with the radiation to be detected to produce neutrons, means for passing a sample of the fluid to be monitored through said duct, and means within said instrument well to detect the neutrons thus produced.

3. The device of claim 2 wherein said material is capable of undergoing a $(\gamma, n)$ reaction to produce photoneutrons and the means within the instrument well is a $BF_3$ neutron counter.

4. The device of claim 3 wherein the said material will undergo a $(\gamma, n)$ reaction with gamma rays having an energy at least as great as 1.31 mev.

5. The device of claim 4 wherein said material is selected from the group comprising heavy water and beryllium.

6. The device of claim 2 wherein said tubular duct is substantially centrally located in said container.

7. The device of claim 3 wherein means for indicating the signal produced in the $BF_3$ counter is electrically connected to the counter and remotely located therefrom.

8. The method of detecting fuel element failures in a nuclear reactor of the type which is provided with a gas blanket comprising tapping a sample of said blanket gas from the reactor, holding said sample outside of the reactor for a period of 5 to 10 minutes, passing said sample through a body of $D_2O$, immersing a $BF_3$ neutron counter in said body of $D_2O$ in close enough proximity to said sample to detect neutrons produced by a $(\gamma, n)$ reaction in the $D_2O$ due to radiation from said sample, and measuring the neutrons thus produced.

References Cited by the Examiner

UNITED STATES PATENTS

| | | | |
|---|---|---|---|
| 2,707,555 | 5/1955 | Gaudin | 250—83.1 X |
| 2,726,338 | 12/1955 | Goodman | 250—83.1 |
| 2,873,377 | 2/1959 | McKay | 250—43.5 |
| 3,174,041 | 3/1965 | Graftieaux et al. | 250—83.6 |

RALPH G. NILSON, *Primary Examiner.*

ARCHIE R. BORCHELT, *Examiner.*